CONTINUOUS RECORDING SYSTEM WITH INDEXING MEANS

Filed Dec. 29, 1944 2 Sheets-Sheet 1

INVENTORS: K.H. DAVIS
A.C. NORWINE
BY W. C. Parnell
ATTORNEY

CONTINUOUS RECORDING SYSTEM WITH INDEXING MEANS

Filed Dec. 29, 1944 2 Sheets-Sheet 2

INVENTORS: K.H. DAVIS
A.C. NORWINE
BY W. C. Parnell
ATTORNEY

3,024,321
CONTINUOUS RECORDING SYSTEM WITH INDEXING MEANS

Kingsbury H. Davis, Bernardsville, and Andrew C. Norwine, Short Hills, N.J., assignors to Bell Telephone Laboratories, Incorporated, New York, N.Y., a corporation of New York Filed Dec. 29, 1944, Ser. No. 570,370
6 Claims. (Cl. 179—100.4)

Figure 1:
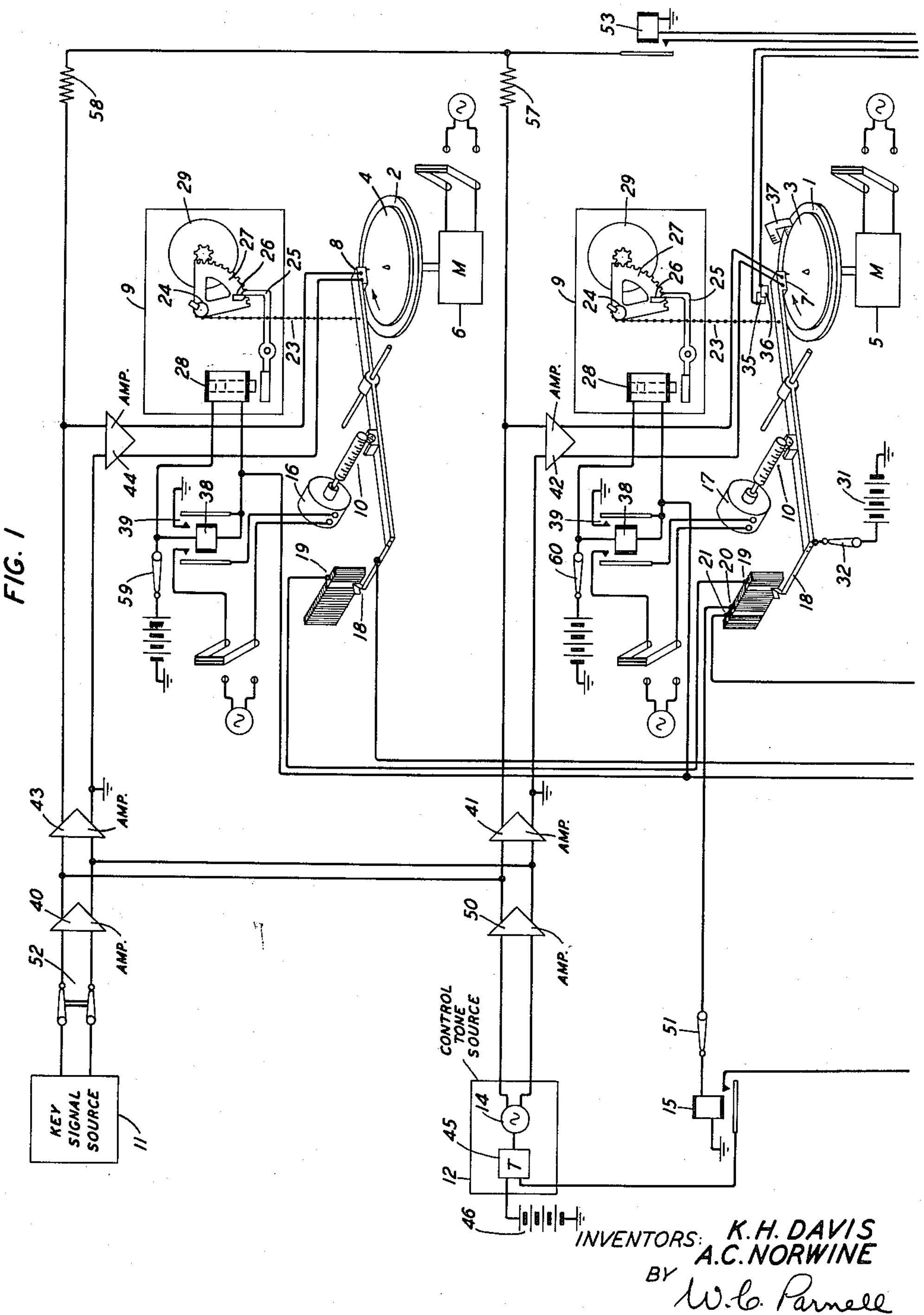

This invention relates to sound recording and particularly to the making of records for continuous reproduction.

While many recording procedures for such records have been proposed heretofore, there are certain applications of continuous recording where the phasing of the reproduction and the switchover from one recording to the next must be held to such extremely close limits that these known procedures have been found to be inadequate.

For example, in secrecy communication systems the messages are sometimes converted to an unintelligible form for transmission by the use at the transmitting station of a key record, the reproduction of which during the transmission effects certain changes in the nature of the currents transmitted. The reconversion of the received signal to an intelligible form requires the use at the receiving station of an exact duplicate record in such a way that it performs on each element of the received signal an operation which is exactly complementary to the operation performed on the same element of the signal at the transmitting station. For a very high degree of secrecy, the nature of the key material is necessarily complex and its successful use requires a new order of precision in the manufacture of the key records.

In a system of this kind, two reproducing turntables are provided at each end of the line so that a second pair of key records may be positioned for reproduction on the second turntable at each station while the two records of the first pair are in actual use. Each record of the pair must be very accurately positioned on its turntable, the two reproducers must be placed in exactly corresponding positions on the records, and when the reproduction of one pair of records is nearing completion the second pair must be brought up to speed in synchronism and the switchover made at exactly the same time at both ends of the line.

The object of this invention is to provide duplicate records which will facilitate continuous reproduction and insure that the above operations will be performed simultaneously at both ends of the line.

According to the invention, one of the turntables used in cutting the records is provided with circuit contacts operated once per turntable revolution to correlate the timing of the various operations involved so as to eliminate any ambiguity in the operations of the two reproducing systems in which the records are to be used. When the duplicate records are pressings made from a single original recording, only one turntable is required, but if duplicate originals are made simultaneously on two separate turntables, the contacts on one turntable are used to correlate the operations involved in making both of the records.

When the recorders are operating near the outer peripheries of the record blanks, the contacts are used to time pulses transmitted to the recorders to produce an indexing mark for later use in aligning the records on the reproducing turntables, as described in greater detail in the copending application of H. L. Barney Serial No. 570,429, filed Dec. 29, 1944.

As the recorder is lowered into contact with the record blank at the start of the recording operation, the stylus first makes grazing contact therewith and the turntable rotates through a considerable angle before the stylus has reached its full normal depth of cut. In other words, there is no definite starting point for the groove and in this area there is some ambibuity as to which is the "first groove." The possibility that this may result in the two reproducers at the opposite ends of the line being positioned in different starting grooves is avoided according to this invention by initiating the recorder dropping operation under the control of the turntable contact and timing the recorder travel so that the ambiguous porion of the first groove lies in an area well removed from the position in which the reproducer stylus will engage the record during reproduction.

In a signaling system of the type described above, unlike a conventional sound reproducing system, it is not necessary to switch from one record to the other at any particular instant, but it is very necessary that the switching operation occur simultaneously at both ends of the line so that the same key material is reproduced at both stations at every instant. According to this invention, the changeover is effected by recording near the end of the key material of each record, a tone which, when reproduced and segregated from the key material in the normal course of operation, can be used to control the necessary switching mechanism. Upon the beginning of the reproduction of the tone, the next record at each station is accelerated from rest to synchronous speed, and at the end of the tone, the key circuits are simultaneously switched to the reproducers engaging these records.

In bringing the new records up to speed, it is usually preferable to have the driving motor running continuously and to connect the stationary turntable, on which the new record has been positioned, to the motor. This is usually effected by suitable relay operated latching mechanism which comes into engaging position once per revolution. This presents a situation analogous to the recorder dropping operation in that if the relays are actuated at an instant when the latches are near engaging position, the turntable at one end of the line may engage at once whereas the turntable at the other end of the line may not engage until the next revolution, thereby introducing a phase difference of one revolution in the two key reproductions. This ambiguity is resolved by having the control tone begin on the record at a point such that when reproduction of the tone begins, the latching mechanisms are well removed in an angular sense from their latching positions. The duration of the tone recorded is timed in any suitable manner to continue for an interval sufficient to insure that during reproduction of the records both turntables will engage and reach a condition of stable, synchronous speed so that when the switching operation is performed in response to the cessation of the tone, the new records continue to furnish exactly the same key at both ends of the line.

Figure 1A:
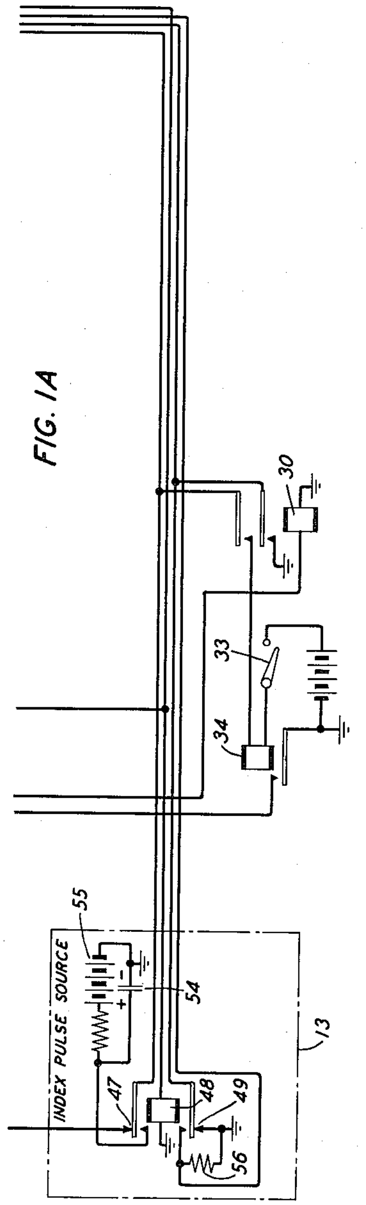
Figure 2:
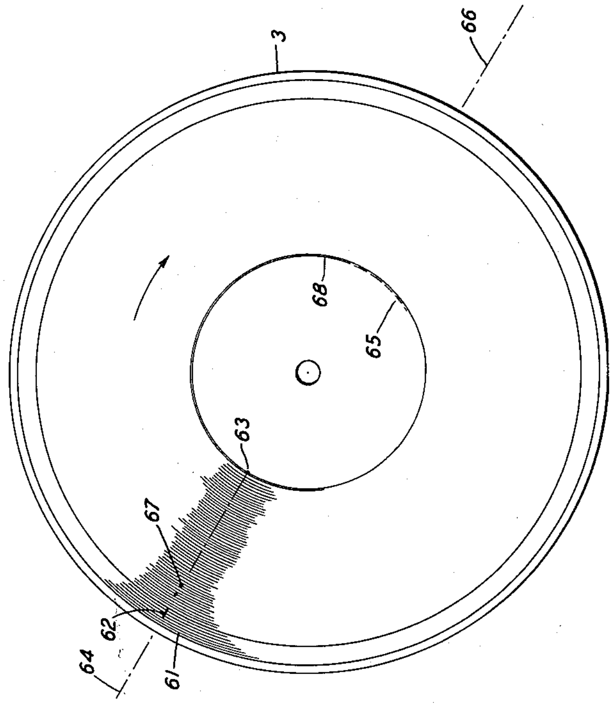

The manner in which the beginning of the record groove and the beginning of the control tone are correlated with the index marks and other features of the invention will be clearly understood from the following detailed description and the drawing, in which FIGS. 1 and 1A show a dual recording system for making duplicate original recordings according to the invention; and FIG. 2 is a typical completed record.

In FIG. 1 the recording turntables 1 and 2 are provided with recording blanks 3 and 4 and are driven at the same speed by synchronous motors 5 and 6. The recorders 7 and 8 are associated with automatic lowering devices 9, 9 and cross-feed mechanisms 10, 10 which in this case move the recorders outwardly along a record radius to record "from the inside out." Key material from the source 11, control tone from the source 12 and indexing pulses from the source 13 are all supplied in succession to both recorders in a manner to be described.

The recording system in which the invention is used in practice is somewhat involved and in order to simplify the disclosure many of the detail features which have no direct relation to this invention have been omitted. For example, the key material is varied in a complex manner but in so far as the present invention is concerned the source 11 may be regarded as merely a source of signals covering a wide band of frequencies and the control tone source 12 may be regarded as any source 14 of electrical oscillations which is controlled by conventional timing mechanism 45 so that its transmission begins a predetermined time after the operation of the associated relay 15 and continued for definite time.

Similarly, the recorder traversing mechanisms may be conventional and are represented in the drawing only by the usual feed screw mechanism and cross-feed motors 16 and 17. In practice, the motion of the recorders across the record blanks is utilized to perform in sequence and at the proper times a large number of operations not directly related to the features of the present invention and this requires rather complex electrical circuits. These circuits may consist, for example, of a stepper switch moving with the recorder and actuated by accurately spaced notches in a stationary bar to operate a relay chain of the type shown in Patent 1,438,743 to Clark. For the purposes of the present invention, the disclosure is greatly simplified by considering this mechanism as comprising essentially a contact 18 driven by the recorder arm and successively closing the required circuits at the proper instants by engagement with fixed, spaced segments 19, 20 and 21, as in Patent 2,247,924 to Saliba, or in FIG. 3 of British Patent 443,801 to Barrett. Various manually operated switches are shown to supplement this automatic switching but it will be understood that most of these manual operations also can be performed automatically in a well-known manner by means of the relay chain.

The recorder lowering mechanism 9 has been indicated in somewat greater detail since its particular mode of operation is directly related to the features of this invention. This mechanism on each machine may consist, for example, of a flexible chain 23 wound on a drum 24 and holding the recorder above the record, the drum being normally held against rotation by a lever 25 engaging a latch 26 on the gear segment 27 which is secured to the drum. When the gear segment is released by energizing the solenoid 28, the rotation of the drum is controlled by a timing device 29 so that the recorder stylus engages the recording surface after the required time interval as explained below. The timing device may be of any suitable type, such as the governor-controlled spring drive for the rotating shaft of a telephone dial as shown in U.S. Patent 2,252,875, August 19, 1941, to C. H. Wheeler.

At the beginning of a recording operation, the motors 5 and 6 are driving the turntables 1 and 2 in synchronism and the recorders 7 and 8 are positioned above the blanks 3 and 4 in starting position with the cutting stylus at the minimum groove radius. In this position the contacts 18 on both machines are in engagement with the segments 19 and relay 30 is held operated over a circuit from the grounded battery 31 through switch 32, the contacts of the two machines and the winding of the relay to ground.

The recording operation is started by closing the recording key 33 to prepare an operating circuit for relay 34 through the contacts of relay 30. The turntable 1 carries a brush 37 which once per revolution bridges the stationary segments 35 and 36, the leading ends of which are accurately aligned with the line of travel of the recorder stylus. When, after the key 33 is closed, the brush again bridges these segments to connect the winding of relay 34 to ground at relay 30, the relay 34 is operated to complete operating circuits for the relays 38, 38 and the solenoids 28, 28. The operation of the relays 38 energizes the cross-feed motors to start the recorders moving across the record blanks, and the operation of the solenoids withdraws the levers 25 from their latches, permitting the recorders to move downwardly into contact with the recording surfaces. While relay 34 is operated only momentarily, it will be noted that the relays 38 are locked up by the closing of the holding contacts 39.

The dropping motion of the recorders is so timed by the mechanism 29 that the styli engage the recording surfaces about one-half a revolution after their release so that the groove begins about diametrically opposite the brush 37. The key material is supplied from the source 11 through amplifiers 40, 41 and 42 to the recorder 7 and through amplifiers 40, 43 and 44 to the recorder 8 and recording proceeds in the usual manner.

Shortly after the start of the recording operation, the contacts 18, 18 move out of engagement with the segments 19, 19 thereby releasing relay 30 and disconnecting the turntable segment 35 from ground at this relay to prepare the indexing circuit for operation as described below. About five revolutions before the recorders reach the outer limit of the space reserved for the key material, the recorder arm contact 18 of the turntable 1 engages the segment 20 thereby operating the relay 15 over an obvious circuit. The operation of this relay prepares a circuit for the timing mechanism 45 of the control tone source 12 from the battery 46 through the timing mechanism, the contacts of relay 15 and back contact 47 of relay 48 to the turntable segment 36, the other segment 35 being at this time grounded through the back contact 49 of relay 48. Upon the next engagement of the brush 37 with these segments, the circuit is momentarily completed and the timing mechanism receives a starting impulse which causes the tone source 14 to begin supplying control tone through the amplifiers 50 and 41 to 44 to the recorders one-half revolution later. The recording of the control tone along with the key material therefore begins diametrically opposite the brush 37 and continues for a sufficient time, such as three revolutions, and is then discontinued under the control of the timing mechanism 45. In order to prevent recycling of the timing mechanism, relay 15 is released during the recording of the control tone. In practice, this relay would be released automatically, but for purposes of the present disclosure, it may be released by opening the switch 51 as soon as the timing mechanism has been actuated.

After the recording of the control tone, the termination of which marks the end of the useful key material, the switch 52 may be opened. The recorders then continue to cut blank grooves until the contact 18 of turntable 1 engages the segment 21, thereby operating the relays 48 and 53. At this time, the condenser 54 of the index pulse source 13 is charged as indicated to the voltage of the battery 55 and upon the next engagement of the brush 37 with the segments 35 and 36, the condenser is discharged over a circuit extending through the bridged segments, the upper and lower front contacts of relay 48 and the resistor 56 to ground. The condenser discharge through this resistor produces a voltage pulse which is transmitted through the contacts of relay 53, the isolating resistors 57 and 58 and the amplifiers 42 and 44 to the recorders, which cut a deep dale in each record at the point substantially in line with the brush 37. As the brush moves out of contact with the segments, thereby opening the discharge path, the condenser 54 recharges and upon the next bridging contact again discharges to produce in the next groove of each record another dale on the same radius line as the first. This process is repeated each revolution for about 20 revolutions, as determined in this case by the length of the contact segment 21, after which the relays 48 and 53 are automatically released.

The records are then complete and the system may be conditioned electrically to record the next pair of records, either automatically by providing additional segments and circuits to be controlled by the recorder traversing motion, or by the manual operation of the necessary switches. With manual operation, opening the recording key 33 releases relay 34, opening keys 59 and 60 releases the relay 38 at each recorder, thereby stopping the recorder cross-feed and deenergizing the solenoid 28. The recorders are then lifted from the records and moved back to their starting positions and the recorder dropping mechanism is latched to hold the recorders until they are again released by the solenoids.

The records made in the manner described above will therefore have, as shown in FIG. 2, a continuous band of grooves extending over the whole available recording surface from the inner starting groove 68 to the outer blank grooves 61 beyond the indexing mark 62. If we assume that the index marks on the reproducing turntables are so related to the operating position of the pick-up reproducer that when the record index is aligned with the turntable mark, the reproducer stylus will engage the starting groove somewhere in the region of the point 63 on the radius 64 through the index, then with the record in this reproducing position, there can be no doubt as to which is the first groove along this radius since the ambiguous portion 65 of the groove is in the region diametrically opposed to the point 63 of stylus contact.

Similarly, assuming that the latching mechanism of the reproducing machine is so disposed that the turntable engages when the record is 180 degrees from the position shown, or in other words, when the index 62 is on the radius 66, then the control tone signal should begin at or near point 67 on the index radius 64 so that both turntables are certain to be conditioned for engagement by the time they have rotated to the next latching position.

It will be understood that the invention is not limited to the particular relative positions shown for the starting groove, the control tone and index marking, since from the general description of the purposes to be accomplished, it will be clear that these positions must be determined with due regard to the details of the design of the particular reproducing machines on which the records are to be used.

The particular recording system and the details of the completed record shown in the drawing are therefore merely illustrative and the invention is intended to be limited only by the scope of the following claims.

What is claimed is:

1. In a dual recording system, the combination with two synchronously driven turntables, a recording disc and a recorder for each turntable and a source of signals to be recorded, of means for lowernig the recorders into contact with the discs, a source of record indexing pulses and a source of control signals to be recorded, circuits for successively connecting both recorders to all of said sources and an electrical contact operated once per revolution of one of the turntables for initiating the operation of the recorder lowering means and for correlating therewith the completion of the circuits between the recorders and the sources of the indexing pulses and the control signals.

2. In a dual recording system, the combination with two synchronously driven turntables, a record disc on each turntable, a recorder supported above each disc and a source of signals connected to both recorders, of cross-feed mechanism for the recorders, means for lowering the recorders into contact with the discs and said mechanism to cut spiral grooves in the discs, sources of control signals and indexing pulses to be recorded, contacts operated in sequence by the cross-feed motion of one of the recorders for successively preparing circuits between the control signal and index pulse sources and both of the recorders and a contact operated once per revolution of one of the turntables for completing the circuits to determine the angular relation in both of the discs of the recorded control signals and index pulses.

3. In a dual recording system, the combination with two synchronously driven turntables, a recording disc and a recorder for each turntable and a source of signals connected to both recorders, of cross-feed and lowering mechanism for each recorder, contacts operated once per turntable revolution, a circuit extending through the contacts for actuating said mechanism and means for timing the lowering operation to cause the recorder to engage both record discs in substantially the same angular position with respect to the contacts.

4. In a recording system, the combination with a rotating turntable, a record disc on the turntable, a recorder engaging and moving across the record disc to cut a spiral groove in the disc and a source of signals connected to the recorder, of a source of control tone of predetermined duration, a source of indexing pulses, circuits successively prepared by the motion of the recorder across the disc for connecting the recorder to said control tone and indexing sources and electrical contacts operated once per revolution of the turntable for completing the circuits and determining the angular relation in the record member of the beginning and ending of the recorded control tone and the mark in the groove produced by the indexing pulses.

5. In a recording system, the combination with a rotating turntable, a recording disc on the turntable, a recorder supported above the blank and a source of signals to be recorded, of means for lowering the recorder into contact with the blank to cut a groove, a source of record indexing pulses, circuits for successively connecting the recorder to said sources, an electrical contact operated once per revolution of the turntable for initiating the operation of the recorder lowering means and for correlating therewith the completion of the circuit between the recorder and the source of indexing pulses and means for timing the action of the recorder lowering means to determine the angular relation in the record disc of the start of the groove and the marks in the groove produced by the indexing pulses.

6. A disc record of a portion of a sequence of recorded signals for continuous reproduction comprising an inner band of grooves containing only the recorded signals, an intermediate band of grooves containing both recorded signals and a control tone and an outer band of grooves containing only a radial indexing mark consisting of a single undulation in each groove of the outer band, the beginning and ending of the control tone being on substantially the same radial line of the record as the indexing mark and the beginning of the inner signal band of grooves being angularly remote from the index mark.

References Cited in the file of this patent

UNITED STATES PATENTS

| | | |
|---|---|---|
| 2,014,528 | Keeler | Sept. 19, 1935 |
| 2,142,591 | Ross | Jan. 3, 1939 |
| 2,306,614 | Clausen | Dec. 29, 1942 |

FOREIGN PATENTS

| | | |
|---|---|---|
| 777,276 | France | Nov. 26, 1934 |